Jan. 9, 1923. 1,441,252.
W. E. C. STONE.
LENS.
ORIGINAL FILED FEB. 8, 1921.

INVENTOR.
Wallace E. C. Stone
BY
Davis & Simins
his ATTORNEYS.

Patented Jan. 9, 1923.

1,441,252

UNITED STATES PATENT OFFICE.

WALLACE E. C. STONE, OF ROCHESTER, NEW YORK.

LENS.

Continuation of application Serial No. 443,436, filed February 8, 1921. This application filed April 28, 1922. Serial No. 557,051.

*To all whom it may concern:*

Be it known that I, WALLACE E. C. STONE, a citizen of the United States, and resident of Rochester, in the county of Monroe and State of New York, have invented certain new and useful Improvments in Lenses, of which the following is a specification.

The present invention relates to a lens, and an object of the invention is to provide a lens designed for signs which are illuminated from the rear. A further object of the invention is to provide a lens which will be visible at a maximum distance from the sign and at any point within a wide angle.

To these and other ends, the invention consists of certain parts and combinations of parts, all of which will be hereinafter described, the novel features being pointed out in the appended claims.

Figure 3:
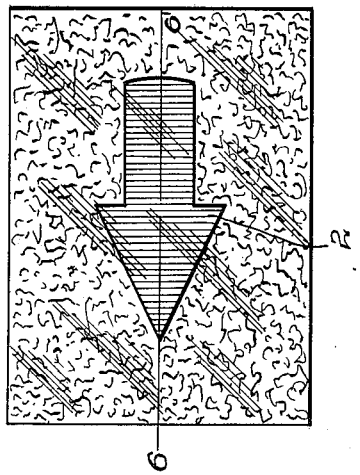
Fig. 3 is a plan view of the rear side showing the lens after the colored glass has been cut to expose the clear glass.
Figure 5:
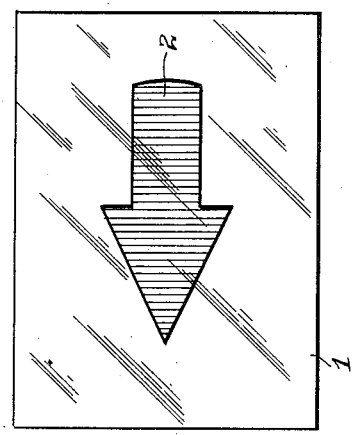
Fig. 5 is a plan view of the rear side of the lens after it has been ground or frosted.
Figure 1:
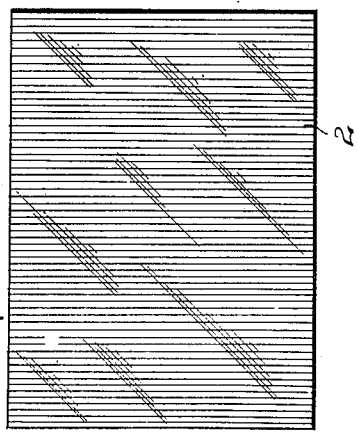
Fig. 1 is a plan view of the glass sheet before it is cut.
Figure 2:
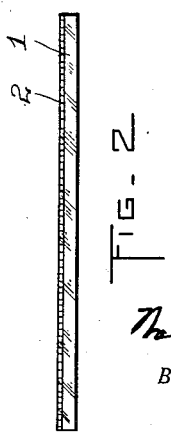
Fig. 2 is an edge view of the glass sheet.
Figure 4:
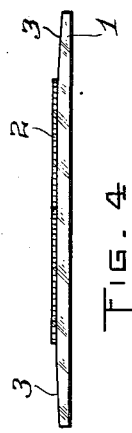
Fig. 4 is an edge view of the lens as shown in Fig. 3.
Figure 6:
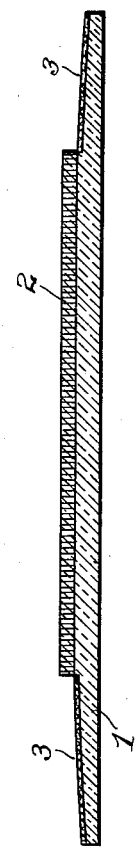
Fig. 6 is an enlarged sectional view of the lens on the line 6—6, Fig. 5.

According to this invention, a glassplate is provided which has a clear glass portion or layer 1 and a colored glass portion or layer 2 formed integrally with the clear glass portion. This colored glass portion is cut to provide a character of any suitable kind, such as a letter, figure, in fact, any suitable design projecting from the surface of the clear glass portion. The clear glass portion around the character is preferably curved outwardly or convex as at 3, so that the longest chord of the curve lies at a slight angle to the plane of the lens, say at an angle of about 170 degrees. The curved surface of the clear glass portion about the character is also ground. The lens is adapted for use in connection with an illuminating means arranged behind the colored and frosted glass side and when so used, the colored character on the lens is visible for a long distance due to the fact that not only is the character illuminated, but that the ground surface about the character provides a back ground of such character that it makes the design visible at a much greater distance than if such ground surface were not provided. Furthermore, the slight curve to the ground surface about the character causes the rays to be concentrated instead of dispersing them and permits the character to be read at any point within a very wide angle.

What I claim as my invention and desire to secure by Letters Patent is:

1. A lens formed to permit the passage of light rays from a light source in rear thereof and comprising a clear glass layer and a character shaped colored layer integrally formed with said clear glass layer on the rear face of the latter, and the rear face of the clear glass layer about the character shaped layer being ground.

2. A lens formed to permit the passage of light rays from a light source in rear thereof and comprising a clear glass layer and a character shaped colored layer integrally formed with said clear glass layer on the rear face of the latter, and the rear face of the clear glass layer about the character shaped layer being ground and also being curved outwardly, the longest chord of said curved face being inclined to the plane of the lens.

3. A lens adapted to be illuminated from a light source in the rear thereof and having a character on its rear face and a curved frosted surface on its rear face about the character, the longest chord of said curved frosted surface being inclined to the plane of the lens.

WALLACE E. C. STONE.